April 21, 1959 F. GEISSL 2,883,477

TRANSMITTING DEVICES FOR SOUND REPRODUCERS

Filed Jan. 21, 1953

INVENTOR:

FRANZ GIESSEL

BY [signature]

ATTORNEY

United States Patent Office 2,883,477

Patented Apr. 21, 1959

2,883,477

TRANSMITTING DEVICES FOR SOUND REPRODUCERS

Franz Geissl, Munich, Germany

Application January 21, 1953, Serial No. 332,147

6 Claims. (Cl. 179—100.4)

The present invention relates generally to sound reproducing devices, and is particularly directed to improvements in sound reproducing devices of the kind used for automatically divulging recorded information through a telephone system, for example, for the purpose of announcing the scores of sporting events, weather forecasts, theatre programs and the like.

In systems of the described character for announcing recorded information in response to the calling of a particular telephone number, the sound reproducing device is generally operative only during the period when the related telephone circuit is completed, and in the intervals between calls the sound reproducing device is at rest. At times, the intervals between successive calls can be of long duration. In existing systems, any failure occurring in the pick-up, amplifier and associated circuits of the sound reproducer while the latter is in operation is immediately evident and the necessary steps can be taken to remedy the defects. However, if the failure occurs during an interval between calls, that is, when the recorded sound is not being transmitted by the pick-up, amplifier and associated circuits, the failure or defect will remain unnoticed until such time as the next call for information is placed.

Accordingly, it is an object of the present invention to provide for detection of failures in the pick-up, amplifier and associated circuits of a sound reproducing device of the described character as soon as such failures occur, even during intervals between transmissions of the recorded message.

Another object is to provide a sound reproducing device of the described character wherein the circuits for transmitting the recorded message and for driving the record turntable are automatically rendered inoperative at the conclusion of the recorded material or message and then automatically put into operation in response to the placement of a call for the recorded information, and wherein a signal is given in response to any failure in the pick-up, amplifier or associated circuits either during normal transmission of the recorded message or during the intervals between such transmissions.

A further object is to provide a sound reproducing device of the described character wherein, during the intervals between successive transmission of the recorded message, a substitute alternating current voltage is imposed upon the pick-up of the recording device, preferably inductively, so that at all times a modulated or varying voltage is fed from the pick-up to the associated amplifier, either as a result of the cooperation between the pick-up and record or by reason of the substitute alternating current voltage, and any extensive interruption in the output of the amplifier is indicative of a failure in the pick-up, amplifier or associated circuits.

Other features and advantages, in addition to the above named, will be apparent from the following description of an illustrative embodiment of the invention when read with reference to the accompanying drawings. It is to be understood, however, that the illustrative embodiment is given by way of example only and that deviations therefrom, or alterations, to suit convenience or requirements may be resorted to within the scope and the meaning of the claims at the end of this specification. In the drawings:

Figures 1, 2, 3, 4:
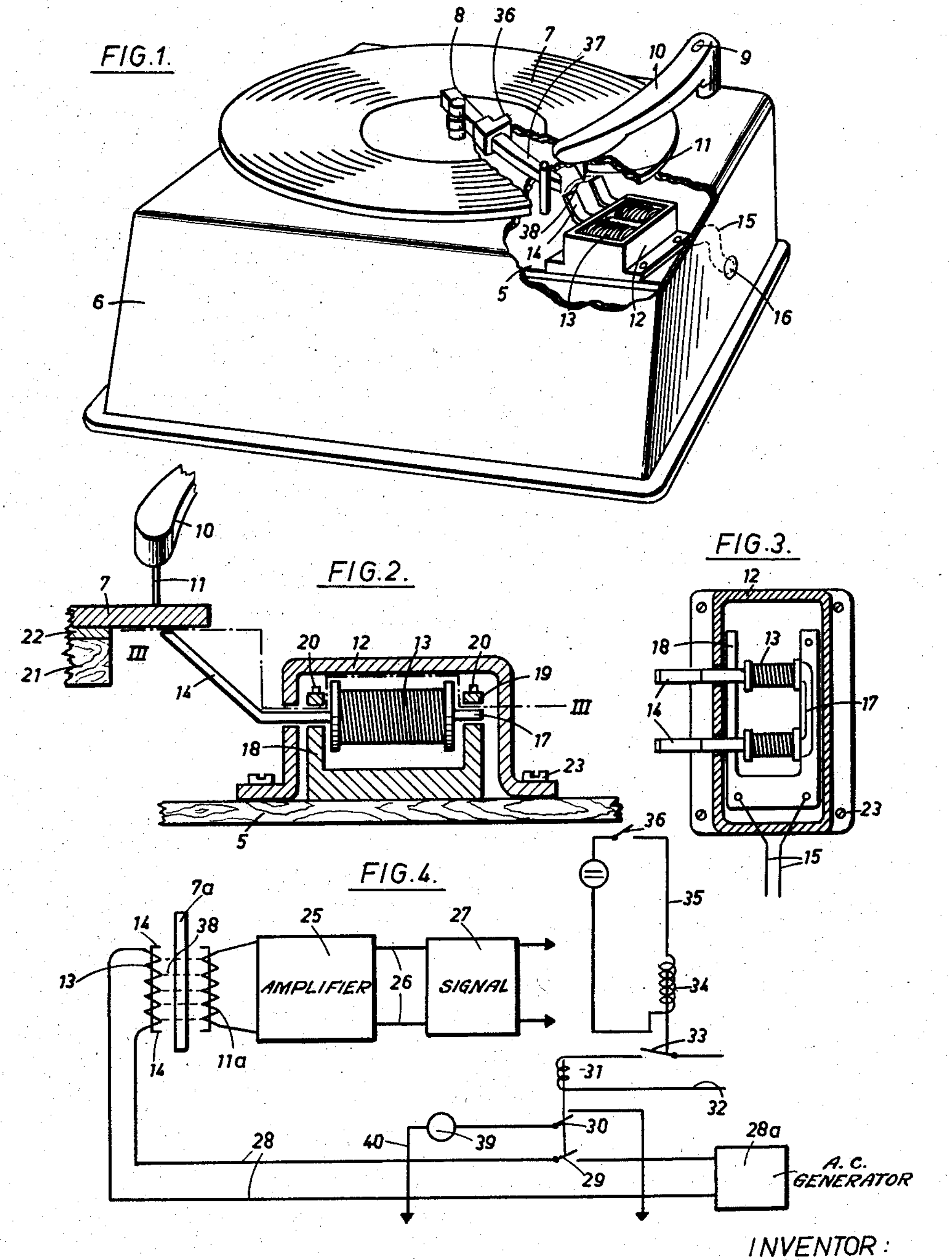
Fig. 1 is a perspective view of a sound reproducing device equipped in accordance with the invention in which the pick-up of the tone arm is supplied with a substitute or auxiliary alternating current voltage by inductive means.
Fig. 2 represents a vertical section through a part of the device shown in Fig. 1 on an enlarged scale and showing the positional relationship of the means for inducing the substitute alternating current voltage to the other parts of the sound reproducing device.
Fig. 3 shows the induction coils from above and is a horizontal section along line III—III of Fig. 2.
Fig. 4 is a wiring diagram showing the connections that may be used in a device such as shown in Fig. 1.

Referring in detail to Figs. 1, 2 and 3, the sound record is shown to be in the shape of a disk 7 and is supported on a turntable 21 having a felt or other slip resistant cover 22 and arranged above the cover 5 of the casing 6 of the sound reproducing device. The turntable is rotatable by the vertical spindle 8 which may be driven by any known means, preferably by an electric motor (not shown). The sound is taken up by the tone arm 10, the stylus or pick-up 11 of which is adapted to ride in the sound grooves of the record 7. A box 12 is provided close to the periphery of the record 7 within the region of the starting position of the tone arm, in which box induction coils 13 are arranged. The poles 14 of the coils extend to positions adjacent and below the peripheral portion of the record 7 so as to be proximate to the tone arm when the latter is in its rest or starting position, and wires 15 lead from the induction coils to a socket contact 16 on the outside of the casing.

The arrangement of the induction coils 13 is more clearly shown in Figs. 2 and 3, from which figures it will be seen that these coils are wound onto a common U-shaped core 17, which is fixed to a frame 18 by means of screws 20 with an insulating plate 19 being interposed between the core and screws. The poles 14 emerge from the box 12 and are upwardly inclined so as to extend towards the peripheral portion of the underside of the record 7, or toward the starting position of the tone arm 10. Screws 23 serve to fix the box 12 to the cover 5 of the casing 6. The wiring diagram which is shown in Fig. 4 indicates the electric arrangement of the device to be as follows: The record is represented by the disk 7*a*. It cooperates with the tone head or pick-up 11*a*. The modulated voltage which is produced in the head 11*a* by the cooperation of stylus 11 with the grooves of record 7, is supplied to a low frequency amplifier system 26 and, in succession, by means of the wires 25 to a relay and valve assembly 27 which is of conventional construction and releases a signal in the case of an interruption of the modulated voltage of excessive duration.

Positioned on the other side of the record 7*a* adjacent the pick-up 11*a* when the latter is in its starting position is the induction coil 13*a*, which is in connection by means of the leads 28, with an alternating current voltage producer 28*a* of approximately 3 to 5 volts and about 450 cycles per second for supplying the auxiliary or substitute alternating current voltage to the pick-up during the intervals between normal operation of the sound reproducer. Provided within the circuit of this auxiliary alternating current voltage is a contact 29, which is coupled with another contact 30 in a circuit 40 for energizing the driving motor 39 of the turntable. Both these contacts 29 and 30 are operated by the armature of a relay coil 31 in the circuit 32 to which voltage is applied when a call is placed through the related telephone circuit to obtain the recorded message. The contacts 29 and 30 are arranged so that contact 30 is closed and contact 29 is opened when the coil 31 is energized, while contact 29 is closed and contact 30 is opened when the coil 31 is de-energized. Also arranged in the circuit 32 is a contact 33, which is operated by the armature of a relay coil 34 in a separate direct current circuit 35, having a contact 36 adapted to be controlled by the movement of the tone arm. For this purpose, as shown in Fig. 1, contact 36 is adjustable, along a radially extending bar 37 so that the tone arm in its movement towards the center of the record may be made to engage and close contact 36 at any required end position.

The auxiliary or substitute alternating current voltage which is supplied by the circuit 28 must have a frequency which is within the frequency range of the speaking voice, and may be taken from a suitable static or rotary generator, indicated only schematically at 28*a*. This substitute alternating current voltage will be supplied to the pick-up 11*a* when the operation of the device is interrupted by opening of switch 30.

As already explained, the induction coils 13 are provided with probe-shaped magnet poles 14, so that the auxiliary alternating current voltage is supplied to the pick-up as an alternating field 38 (Figs. 1 and 4) which, as aforesaid, is imposed on the pick-up 11*a* in a predetermined position, namely the starting position, of the tone arm 10. Thus the alternating field 38 is produced in the pick-up only when the sound producing device is inoperative, that is, between successive calls for the recorded message or information.

Assuming that the sound reproducing voice is at rest, with the circuit 32 being opened or incomplete so that relay coil 31 is deenergized, it will be apparent that the contacts 29 and 30 are respectively closed and open thereby to feed the substitute alternating current voltage from the source 28*a* to the pick-up 11*a* of the tone arm. So long as the pick-up amplifiers and associated circuits of the sound reproducing device are in operative condition, the substitute alternating current voltage will be amplified and passed through such circuits so that the signal releasing device 27*a* will not encounter an interruption of excessive duration. If a failure occurs in the pick-up or associated amplifiers and circuits, the interruption in the current fed to the signal releasing arrangement 27*a* can be employed to operate a suitable signal so that steps can be made to remedy the defect in the device prior to the receipt of a subsequent call for the recorded message or information.

When the calling circuit 32 is completed, for example, by closing of a usual relay operated switch (not shown) in that circuit, relay 31 will be energized, assuming that the contact 33 of the circuit 32 is also in its closed position. When relay 31 is energized, switch 30 will be closed to energize motor 39 driving the turntable 21, and simultaneously switch 29 will be opened to interrupt or halt the feeding of the substitute alternating current voltage to the pick-up 11*a*. As the turntable 21 is rotated with the stylus 11 of the tone arm 10 in contact with the record 7 on the turntable, the cooperation of the stylus with the grooves of the record will be effective to produce a normal modulated voltage in the pick-up which is then fed through the amplifier 25, relay and valve assembly 27 and the associated circuits to the open telephone circuit. During such normal operation of the sound reproducing voice, the signal releasing arrangement 27*a* will again be effective to signal the occurrence of any failure or defect causing an excessive interruption in the transmission of the recorded sound.

When the tone arm 10 has moved radially inward across the record 7, so that the stylus 11 engages the innermost grooves of the record, the tone arm engages contact 36 on the support arm 37 and closes the contact 36 which is interposed in the circuit 35. Closing of contact 36 serves to energize the relay coil 34 which is then operative to open contact 33 in circuit 32. Opening of contact 33 causes deenergization of relay coil 31 so that contact 30 is open to halt the operation of the turntable motor 39, while contact 29 is simultaneously closed to again supply the substitute alternating current voltage to the induction coils 13 for inductive transmission to the pick-up 11*a* when the latter is returned, automatically, by suitable conventional mechanism, to its starting position adjacent the outer periphery of record 7. Accordingly, at the completion of the recorded message, the sound reproducing device is automatically restored to a condition in which it is prepared to again supply the recorded message, while a substitute alternating current voltage is automatically imposed upon the pick-up 11*a*, to replace the normal modulated voltage produced in the pick-up by contact of the stylus with the record grooves, such substitute alternating current voltage providing a basis for determining the continued operativeness of the sound reproducing circuits during intervals between successive calls for the recorded message or information.

In connection with the substitute alternating current voltage produced by the device 28*a*, it is important to note that the substitute voltage should have a value which is substantially the same as that of the normal modulated voltage produced in the pick-up 11*a* by the cooperative engagement of the stylus with the record grooves, as well as a frequency corresponding to the range of the speaking voice, for example, 450 cycles per second.

While a particular embodiment of the invention has been described in detail herein and illustrated in the accompanying drawing, it is to be understood that the invention is not limited to that precise embodiment, and that various other arrangements, coming within the invention as defined by the appended claims, may be employed for the purpose of producing the substitute alternating current voltage in the pick-up of the sound reproducing device during the intervals between successive calls for the recorded message or information.

What I claim is:

1. In a sound reproducing device of the described character; the combination of a record of the sound to be reproduced, means for driving said record, pick-up means cooperating with said record to produce a modulated voltage characteristic of the recorded sound during periods when the record is being driven, transmission means connected to said pick-up means for transmitting a modulated voltage from the latter, means supplying a substitute alternating current voltage to said pick-up means during intervals when said record is at rest, and signal means operative in response to an extensive interruption in the output of said transmission means to indicate a defect in the circuit including the pick-up and transmission means.

2. In a sound reproducing device of the described character; the combination of a record of the sound to be reproduced, means for driving said record, pick-up means cooperating with said record to produce a modulated voltage characteristic of the recorded sound during periods when the record is being driven, an amplifying and transmitting circuit connected to said pick-up means for transmitting modulated voltage from the latter, induction coils positioned to be proximate to said pick-up means when said record is at rest, and means imposing a substitute alternating current voltage on said coils when said record is at rest so that said substitute alternating current voltage is induced in said pick-up means in place of the modulated voltage characteristic of the recorded sound, whereby any extended interruption in the output of said amplifying and transmitting circuit, even during intervals between said periods when the record is being driven, indicates a failure in said circuit.

3. In a sound reproducing device of the described character; the combination according to claim 2, further comprising a tone arm carrying said pick-up means and movable, during driving of the record, across the latter between a rest position and an end position, and means mounting said induction coils at a location adjacent said rest position of the tone arm.

4. In a sound reproducing device of the described character; the combination according to claim 2, further comprising signal means operative in response to the interruption of the output of said amplifying and transmitting circuit for more than a predetermined interval of time.

5. In a sound reproducing device of the described character; the combination according to claim 2, wherein said means for driving the record includes an electric motor and a source of electricity for energizing the motor, and further comprising a first switch interposed between said motor and source, a second switch interposed between said coils and said means imposing a substitute alternating current voltage, and means simultaneously actuating said first and second switches so that said first switch is open and closed when said second switch is closed and open, respectively.

6. In a sound reproducing device of the described character; the combination according to claim 5, further comprising a tone arm carrying said pick-up means and movable, during driving of the record, between a rest position and an end position, and wherein said actuating means for said first and second switches includes a relay, a circuit for energizing said relay and having a third switch interposed therein, and means actuated by said tone arm at the end position of the latter to open said third switch thereby to deenergize said relay for opening said first switch so that driving of the record is then halted and the substitute alternating current voltage is imposed on the pick-up means.

References Cited in the file of this patent

UNITED STATES PATENTS

| | | |
|---|---|---|
| 1,842,895 | Chadwick | Jan. 26, 1932 |
| 2,068,106 | Horn et al. | Jan. 19, 1937 |